A. F. HOWE.
SAW GUARD.
APPLICATION FILED JAN. 6, 1913.
1,148,169.
Patented July 27, 1915.
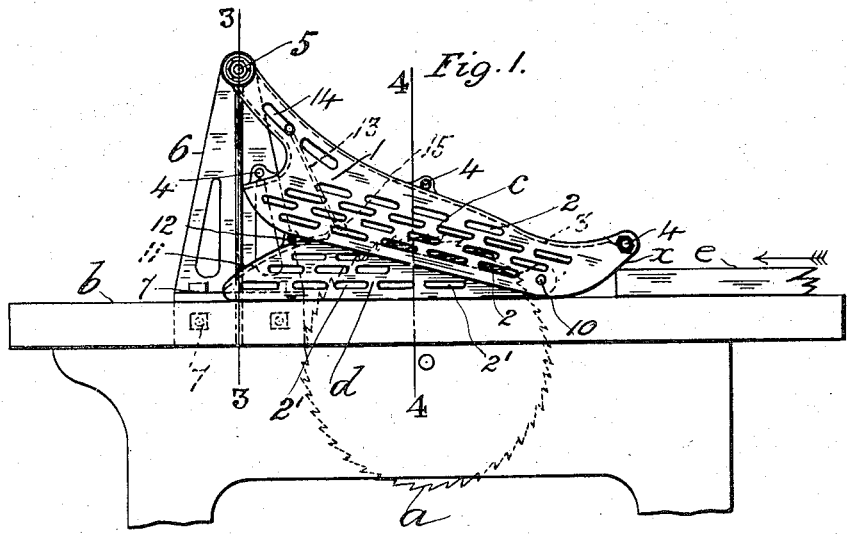
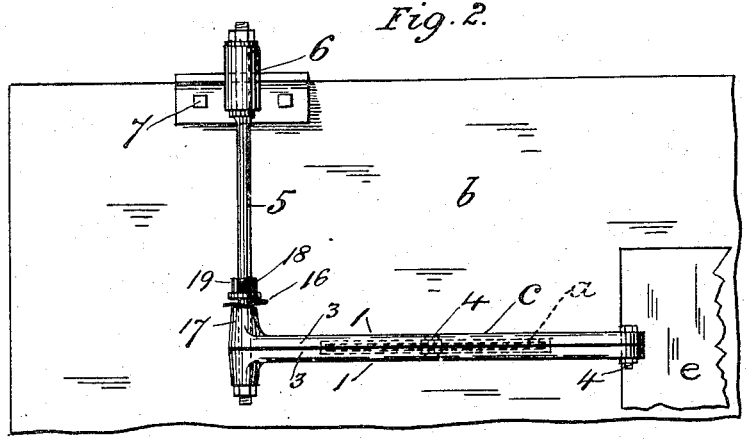
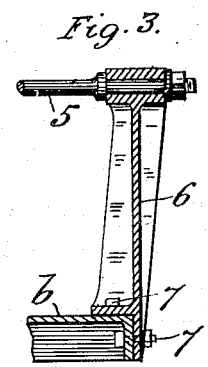
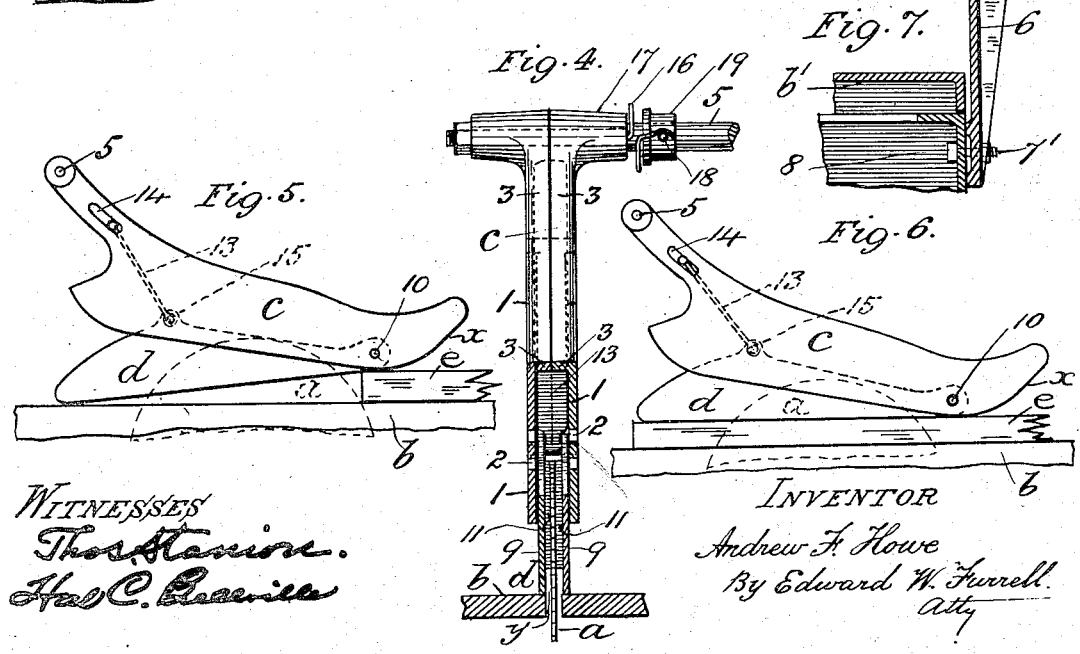
WITNESSES
INVENTOR
Andrew F. Howe
By Edward W. Furrell.
Atty

UNITED STATES PATENT OFFICE.

ANDREW F. HOWE, OF GRANITE CITY, ILLINOIS.

SAW-GUARD.

1,148,169. Specification of Letters Patent. Patented July 27, 1915.

Application filed January 6, 1913. Serial No. 740,427.

*To all whom it may concern:*

Be it known that I, ANDREW F. HOWE, a citizen of the United States, residing at Granite City, in the county of Madison and State of Illinois, have invented a new and useful Improvement in Saw-Guards, of which the following is a specification.

My invention relates to a circular saw guard, and has for its object to prevent the hands of the operator from being caught by the saw while passing the material to be cut thereby along the table, and removing it therefrom when cut.

It consists in features of novelty as hereinafter described and claimed, reference being had to the accompanying drawing forming part of this specification, whereon, Figure 1, is a side elevation of my improved guard as applied to a circular saw and its table (broken away); Fig. 2, a top plan of the same; Fig. 3, a vertical transverse section through a part of the device on line 3, 3, in Fig. 1; Fig. 4, a vertical transverse section to enlarged scale, through the guard on line 4, 4, in Fig. 1; Figs. 5 and 6, diagrammatic views corresponding to Fig. 1, of the guard as seen in different positions of the material while being passed through the saw, and Fig. 7, a similar view to Fig. 3, showing a modification of that part of the device.

Like letters and numerals of reference denote like parts in all the figures.

$a$ represents a circular saw mounted in, and projecting partly upward from the table $b$ (broken away) in the usual well-known manner.

My improved saw guard comprises an outer hood or main member $c$ and an inner hood or auxiliary member $d$ movable within the outer hood or main member $c$ and coacting therewith to cover and form a shield to the teeth of the projecting part of the saw $a$ above the table $b$ at all times, the hoods $c$ and $d$, which may be composed of aluminum, cast, or malleable cast iron, wood, or other suitable material, being preferably, made in halves respectively, arranged in the plane of the saw $a$, as hereinafter more particularly set forth.

The outer hood or main member $c$ consists preferably, in the present case of two flat side pieces 1 arranged vertically at a suitable distance apart, one on each side and clear of the saw $a$, and having respectively, lightening openings 2 therethrough which enable the saw $a$ to be seen by the operator for regulating its height from the table $b$ according to the cut required. Each side piece 1 is preferably formed with a top flange 3, the flanges 3 meeting edgewise, preferably in the plane of the saw $a$, and with the sides 1, preferably, secured together thereat by bolts or screws 4, whereby the hood $c$ is closed along the top and open at the bottom for covering and forming a shield to the upper and forward teeth of the projecting part of the saw $a$ above the table $b$. The hood $c$ at its front end preferably, overhangs the table $b$ as shown in Fig. 1, and is thence formed with a downwardly and rearwardly curved (or inclined) surface $x$ (for the purpose hereinafter described) which extends for a suitable depth or distance from the said end to the underside (or bottom edges of the side pieces 1) of the hood $c$ which bears thereat on the table $b$, and thence normally inclines upward from the said bearing toward the rear end of the hood $c$ as shown.

The hood $c$ is preferably hinged at its rear end on a shaft 5 which extends horizontally at a suitable height from the table $b$ to one side (as shown) or other convenient part thereof, where it is fixed in an upright bracket 6 secured at its base to the table $b$ by bolts or screws 7 as shown in Fig. 3, whereby the hood $c$ is movable in a vertical plane about its shaft 5.

In the case of a tilting table $b'$ being used, as shown in Fig. 7, in lieu of the fixed table $b$ seen in Figs. 1, 2, and 3, the base of the bracket 6 is modified accordingly and secured to the frame or fixed part 8 of the table $b'$ by bolts or screws 7'.

Within the outer hood or main member $c$ is arranged the inner hood or auxiliary member $d$ which consists preferably, of two parallel flat side pieces 9 having respectively, openings 2' therethrough similar to the openings 2 of the hood $c$, each side piece 9 being hinged at its front end by a pin 10 to the corresponding side piece 1 of the hood $c$ preferably near the bottom edge thereof and at a suitable distance rearward from its front end, the sides 9 being preferably, in slidable contact, or thereabout, with the inner faces of the sides 1 and clear of the sides of the projecting part of the saw $a$ above the table $b$, which occupies the space $y$ between the sides 9.

Each side 9 for a suitable distance from its rear end, is formed with a top flange 11, the flanges 11 meeting edgewise, preferably in the plane of the saw $a$, and with the sides 9 preferably secured together thereat by bolts or screws 12, whereby the inner hood $d$ between its hinge 10 and flanges 11, is open at the top, the bottom edges of the sides 9 normally bearing for their entire length on the table $b$ as seen in Fig. 1, in which position of the parts, the teeth of the projecting part of the saw $a$ above the table $b$ are completely covered by the hoods $c$ and $d$.

For limiting the swing of the inner hood $d$ about its hinge 10 and thereby preventing it from fouling and damaging the saw $a$ when the hood or main member $c$ is thrown up out of the way of the latter, I connect the hoods $c$ and $d$ together preferably, by a rod 13, having its upper end pivoted in, and adjustable along two opposite openings 14 formed through the sides 1 respectively, of the hood $c$, and its lower end pivoted in two opposite lugs 15 formed on the top, or flanges 11 respectively, of the inner hood $d$, whereby the movement of the latter about its hinge 10 relatively to the outer hood $c$ is limited by the length of the rod 13.

In operation, on passing the material $e$ (shown in the present case as part of a plank or board of ordinary thickness) to be cut, along the table $b$ toward the saw $a$, as indicated by the arrow in Fig. 1, the forward end of the material $e$ will strike the convex (or inclined) surface $x$ of the hood $c$ at its front end, and by operating wedgewise thereon, will raise the hood $c$ about its hinge 5, and with it the inner hood $d$ about its hinge 10, the rear end of the latter, due to the weight of the hood $d$, bearing on the table $b$ as seen in Fig. 5, whereby the teeth of the projecting part of the saw $a$ above the table $b$ will remain covered by the hoods $c$ and $d$. As the material $e$ is further advanced along the table $b$ from the position seen in Fig. 5, it will raise the inner hood $d$ about its hinge 10 until the bottom edges of its sides 9 are level with, and bear on the top of the material $e$, as seen in Fig. 6, in which position of the parts the teeth of the saw $a$ will remain covered by the hoods $c$ and $d$, and so on, until the material $e$ leaves the saw $a$, when the hoods $c$ and $d$ will return automatically to their normal positions, as seen in Fig. 1, or in other words, the teeth of the saw $a$ above the table $b$ will remain covered by the hoods $c$ and $d$ and the hands of the operator thereby prevented from coming in contact therewith at all times while passing the material through the saw $a$ and removing it therefrom when cut.

For taking up the weight of the hoods $c$ and $d$ and so facilitating the initial lifting of the same about the hinge 5 by the material $e$ when the latter strikes the front end of the hood $c$, I preferably use a spiral spring 16 which is coiled around the shaft 5, one end of the spring 16 being fixed in the hub 17 of the outer hood $c$ on the shaft 5, and its other end preferably bent for engaging a pin 18 which projects from the circumference of a bush or collar 19 fixed on the shaft 5 at a suitable distance from the hub 17, whereby the tension imparted to the spring 16 by the weight of the hoods $c$ and $d$ operates to partly counterbalance the latter. Or if desired a counterbalance weight may be used in lieu of the spring 16.

If desired the bolts or screws 4 and 12 for fixing the halves of the hoods $c$ and $d$ respectively, together may be dispensed with, and each half operate independently of the other, whereby when it is required to adjust the fence (not shown) on the table $b$ as closely as possible to the side of the saw $a$ for cutting through the material within a short distance of its bearing edge against the said fence, the halves of the hoods $c$ and $d$ respectively, on that side of the saw $a$, can be thrown up out of the way of the latter and the outer halves of the hoods $c$ and $d$ at the other side of the saw $a$ alone used as a guard.

What I claim as my invention and desire to secure by Letters Patent is:

1. In a saw guard, the combination of an outer hood pivoted to the saw table, and an inner hood pivoted to the outer hood.

2. In a saw guard, the combination of an arm fixed to the saw table, an outer hood pivoted to the said arm, and an inner hood pivoted to the outer hood.

3. In a saw guard, the combination of an outer hood pivoted at one end to the saw table and bearing at its other end on the said table, and adapted thereat to be raised by the material to be sawn, and an inner hood pivoted at one end to the outer hood and adapted, when raised by the outer hood, to bear at its other end on the said table.

4. In a saw guard, the combination of an arm fixed to the saw table, an outer hood pivoted at one end to the said arm and bearing at its other end on the said table, and adapted thereat to be raised by the material to be sawn, and an inner hood pivoted at one end to the outer hood and adapted, when raised by the outer hood, to bear at its other end on the said table.

ANDREW F. HOWE.

Witnesses:
 Thos. Stanion,
 Edward W. Furrell.